Sept. 23, 1941.	E. P. FORD	2,256,976
VENDING MACHINE
Filed May 1, 1939	3 Sheets-Sheet 1

INVENTOR.
Everett P. Ford.
BY
Chas. E. Townsend.
ATTORNEY.

Sept. 23, 1941.  E. P. FORD  2,256,976

VENDING MACHINE

Filed May 1, 1939   3 Sheets-Sheet 2

INVENTOR.
Everett P. Ford
BY
Chas. E. Townsend
ATTORNEY.

Sept. 23, 1941.                    E. P. FORD                    2,256,976
                              VENDING MACHINE
                            Filed May 1, 1939              3 Sheets-Sheet 3

Fig. 6.

INVENTOR.
Everett P. Ford.

BY

Chas. E. Townsend.
ATTORNEY.

Patented Sept. 23, 1941

2,256,976

UNITED STATES PATENT OFFICE 2,256,976

VENDING MACHINE

Everett P. Ford, San Francisco, Calif., assignor of one-half to Lloyd H. Garrison, San Francisco, Calif.

Application May 1, 1939, Serial No. 271,009

8 Claims. (Cl. 219—19)

This invention relates to a food heating and vending machine.

The object of the present invention is to provide a machine which is particularly intended for heating and vending small sausages such as frankfurters and the like, which have been placed within a bun; to provide a sealed wrapper for the sausage-containing bun, which wrapper is made from Cellophane or like material so as to promote keeping qualities and, above all, to insure sanitation; to provide a machine which makes it possible to cook or heat the sausage and bun within the wrapper without removal of the wrapper and to deliver the bun and sausage when heated intact within the wrapper to the purchaser; to provide a machine having a comparatively large storage capacity for buns or sandwiches of the character described; to provide means whereby when a coin is inserted, a wrapped bun or sandwich is automatically removed, then heated, and finally delivered to the purchaser; and further to provide a machine in which heating of the buns or sandwiches is accomplished by the insertion of a pair of electrodes, said electrodes when inserted puncturing the ends of the wrapper and partially entering the opposite ends of the sausage contained within the bun so that when current is applied the sausage functions as a resistance medium whereby heat is generated to heat the sausage and bun.

The invention is shown by way of illustration in the accompanying drawings, in which—

Fig. 6 is a wiring diagram of the several circuits employed in the machine.

The machine here shown is particularly intended for vending small sausages such as frankfurters and the like, said frankfurters being enclosed in a bun and the whole being wrapped and sealed with Cellophane or a like material. The purpose of the wrapper is to promote keeping qualities and above all, to insure the utmost in sanitation. Sausage sandwiches of this character are generally known as "hot dogs," and, as the name implies, the sandwich must be heated before serving. The present machine is a coin controlled vending machine and provides means whereby when the coin is inserted, a wrapped sandwich is removed from a hopper, then heated to desired temperature, and finally delivered in the heated condition to the purchaser.

Figure 1:
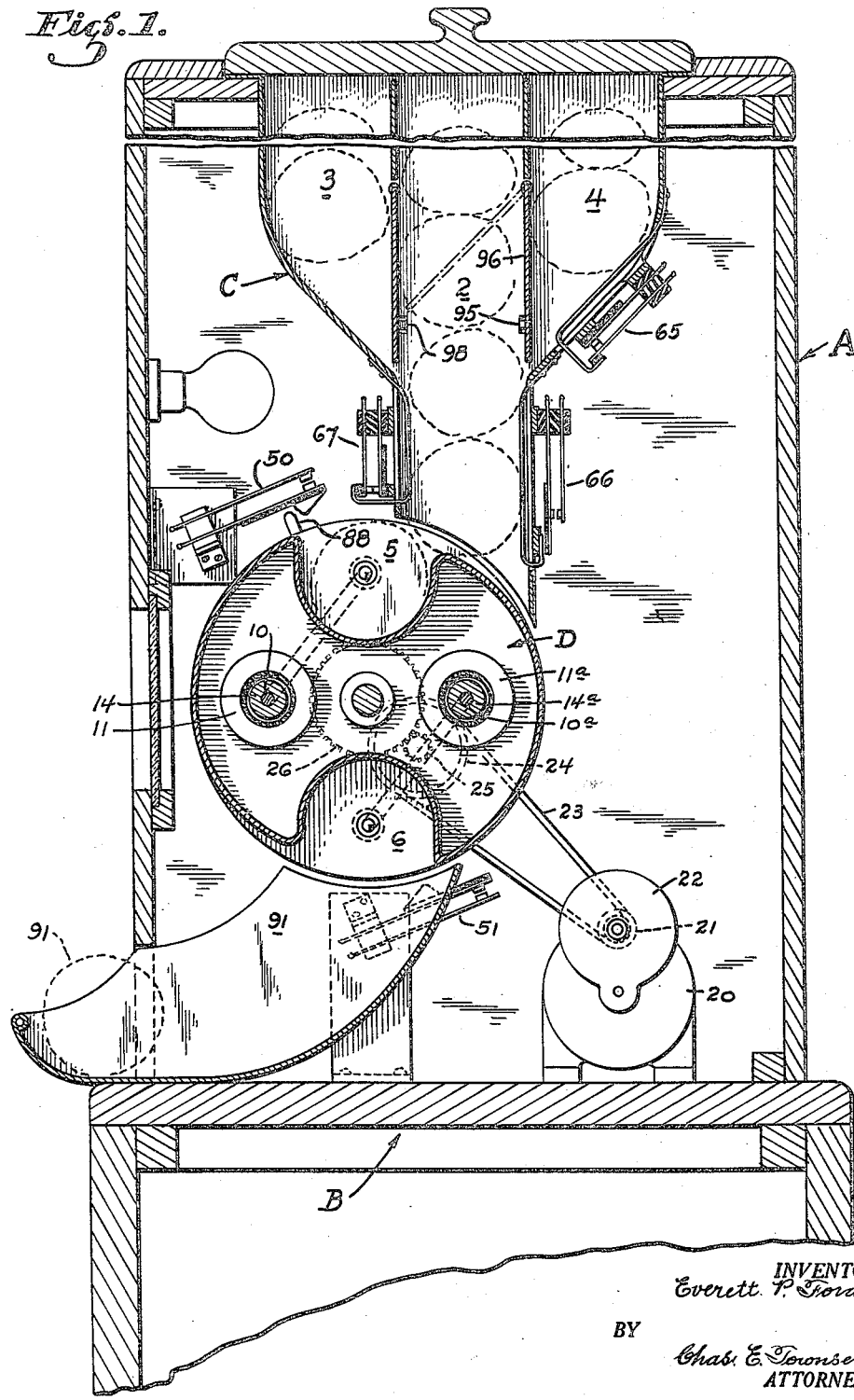
Fig. 1 is the central vertical cross section of the machine.
Figure 4:
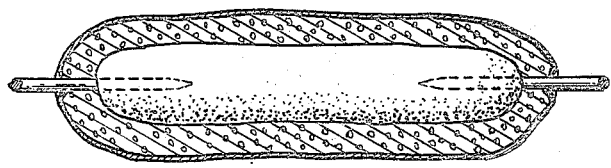
Fig. 4 is the longitudinal section of the wrapped bun or sandwich.
Figure 5:
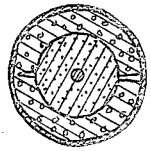
Fig. 5 is the cross section of the same.

The machine (see Fig. 1) in particular comprises a housing A supported by a base B. Hung from the top of the housing is a storage magazine or hopper C which is divided into a central compartment 2 and a pair of side compartments 3 and 4. The sandwiches to be heated and vended are wrapped in package form, and each package is elongated as shown in Fig. 4 and substantially cylindrical in cross section as shown in Fig. 5. The wrapped sandwiches are stacked vertically one on top of the other in each compartment as shown in Fig. 1, and the number of packages contained in each compartment will depend upon the vertical height of the hopper and the compartments formed therein. For instance, there may be twelve packages in each side compartment and fourteen in the central compartment, as this compartment is longer or deeper, thus making it possible to vend 38 packages before reloading becomes necessary.

Figure 2:
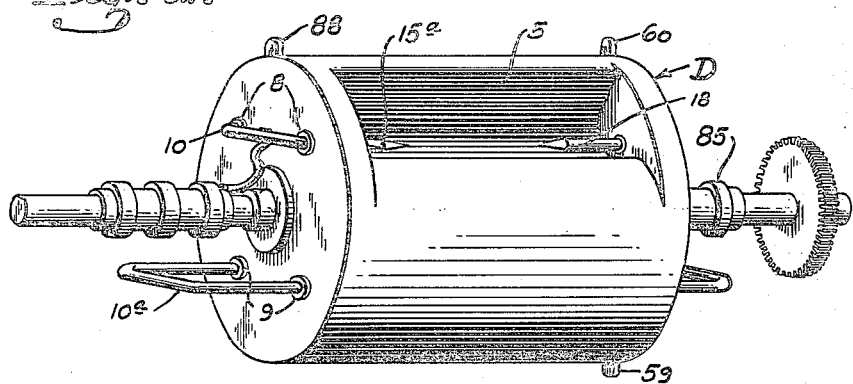
Fig. 2 is a perspective view of the drum and electrodes carried thereby.
Figure 3:
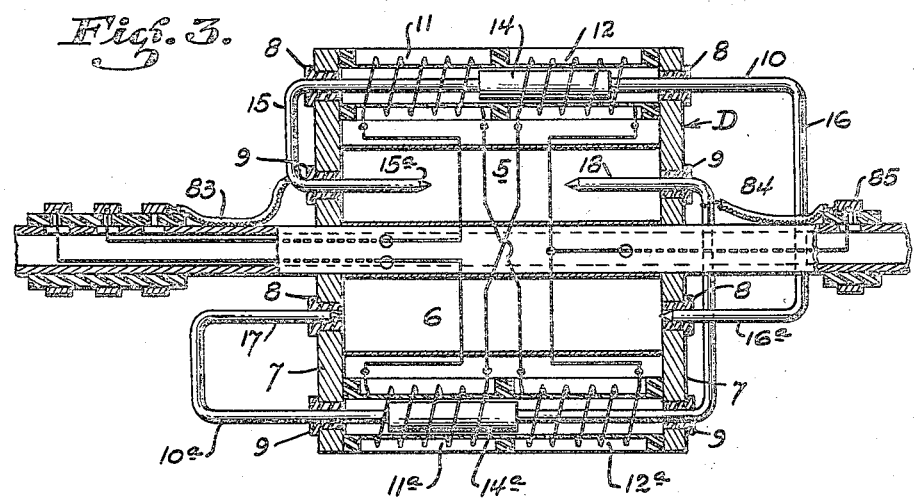
Fig. 3 is the longitudinal section of the drum in diagrammatic form.

Mounted below the central compartment 2 of the hopper is a drum D, and formed therein are two pockets 5 and 6 of sufficient length and depth to receive a wrapped sandwich. Each end of the drum is provided with a head member 7, and carried by each head member are bushings 8 and 9 arranged in pairs as shown in Figs. 2 and 3. The bushings serve two functions, first, that of bearings and guides to support a pair of rods 10 and 10a, and secondly, that of insulators and for this reason are constructed of insulating material, this being essential as an electric current is passed through the rods when a sandwich is to be heated, as will be hereinafter described.

Referring to Fig. 3, it will be noted that the two rods are substantially identical, and as their construction and functions are also identical, the description of one will accordingly suffice. The upper rod 10 is supported and guided by the bushings 8—8. The rod extends through these bushings and also through a pair of solenoid magnets 11 and 12 mounted within the drum. An armature or movable core member 14 is secured on the rod; by energizing the magnet 12, the core is pulled into the position shown in Fig. 3, and as it is secured to the rod, the rod will move in the same direction. If magnet 11 is energized, the movement will be in the opposite direction. Both ends of the rod are U- shaped as indicated at 15 and 16. The U-shaped end indicated at 15 is the smallest and therefore permits the pointed end 15a to pass through the bushing 9 and to project into one end of the pocket 5. The opposite U-shaped end of the rod is larger and its pointed end 16a passes through the bushing 9 into the opposite end of the pocket 6. The pointed ends of the rod 10a are indicated at 17 and 18. The ends 15a and 18 cooperate and so do the ends 16a and 17. The pointed ends 15a, 18, and 16a and 17 function as perforators and as electrodes and will hereinafter be referred to as electrodes. The rod 10a also extends through a pair of solenoid magnets such as indicated at 11a and 12a and is provided with a core member 14a and U-shaped ends terminating in points 17 and 18. Magnets 12 and 11a are energized in unison and so are the magnets 11 and 12a. Hence when the magnets 12 and 11a are energized, rod 10 will move to the right and rod 10a to the left (see Fig. 3) causing the electrodes 15a and 18 to enter the pocket 5 and the electrodes 17 and 16a to be withdrawn from the pocket 6. Vice versa, when the magnets 11 and 12a are energized, the movement of the rods will be reversed and the electrodes 17 and 16a will enter the pocket 6 while the electrodes 15a and 18 will be withdrawn from the pocket 5.

The drum D makes a one-half revolution during each cycle of operation, and power to drive it is derived from an electric motor 20. This motor drives a pulley 21 through a speed reduction gear 22. A pulley 21 through a belt 23 drives a pulley 24, and through gears 25, shaft 26, upon which the drum is secured and by which it is driven. The circuit through the motor is closed through the operation of a coin control mechanism and the circuit is automatically broken when a one-half revolution of the drum is completed. This is accomplished as follows: Disposed adjacent one side of the housing A is a coin receiving chute 28. When a coin is inserted therein, it will, if the hopper is not empty, drop straight down and engage a switch arm 29 which closes a pair of contacts 30. The current employed is obtained from the secondary 31 of a transformer, the primary side of which is shown at 32. A circuit through the primary side of this transformer is always maintained when the machine is in operation, as it is supplied with current from a main line circuit indicated by the wires 33 and 34. This circuit can be traced as follows: The wire 33 is connected to one side of the primary transformer and the wire 34 is connected with the other side of the primary of the transformer through wire 35. When the contacts 30 are closed, current is derived from the secondary side 31 of the transformer and the circuit can be traced as follows: Commencing with the wire 36, the current passes through a wire 37 to wire 38, then passes through the contacts and wire 39 to wire 40 which is connected to one terminal of a solenoid coil 41; it then passes through the opposite terminal of the coil and wire 42 which is connected by means of wire 43 to the opposite terminal of the secondary side 31 of the transformer. The circuit established through the contacts or switch 30 is only momentary and would be broken the moment the coin passes by the arm 29. To maintain the circuit established by the contacts 30, coil 41 functions as a holding coil. When it becomes energized, it attracts the core 44 and thereby pulls a contact bar 45 into engagement with a series of contacts indicated at 46, 47, 48, and 49. When the contact 46 is closed, the current will pass through a cooperating contact and wire 48 and, as this connects with the wire 37, the circuit through the coil 41 is maintained and the switch or contacts 30 are free to open without interrupting the circuit.

The contacts 47 and 48 when closed prepare circuits which control energization of the magnets 12 and 11a and the magnets 11 and 12a, the contact 47 preparing the circuit for the magnets 12 and 11a and the contact 48 preparing the circuit for the magnets 11 and 12a, the circuits through the magnets being finally closed by a pair of switches indicated at 50 and 51. Switch 50 closes the circuit through the magnets 11 and 12a and switch 51 closes the circuit through the magnets 12 and 11a. Contact 49 closes a circuit through both sets of electrodes. In addition thereto, it closes a circuit through the motor 20. This circuit can be traced as follows: Commencing with wire 33, the current passes through the wire 52, then through the contacts 49, wire 53, wire 54, and through that wire enters one terminal of the motor. The current then passes out through the opposite terminal and through wires 55 and 35 and thus returns to the opposite side of the main supply circuit 34. The circuit through the motor will be maintained until the cycle of operation is completed and it will then be automatically broken by momentarily short-circuiting the secondary 31 of the transformer. This is accomplished as follows: Adjacent one end of the drum is mounted a switch 57 actuated by a weighted lever 58. On the drum is mounted a pair of pins 59 and 60. Whenever one of these pins engages the weighted lever 58, it momentarily closes the contacts or switch 57 and through wires 60 and 61 connected therewith thereby and momentarily shorting the secondary 31 of the transformer. In doing so it breaks the circuit through the holding coil 41 and thereby simultaneously breaks the circuits through all of the contacts 46, 47, 48, and 49. All circuits previously established in the machine are thus broken.

It will be noted that three switches are located adjacent the lower end of the hopper and they are indicated at 65, 66, and 67. Each switch has a spring arm which projects through a slot formed adjacent it in the side wall of the hopper. These arms project a slight distance inside of the container and they are yieldable so that when weight is applied thereto, they will cause certain switches to close and others to open. The weight relied upon to actuate the switches are the wrapped sandwiches themselves. If the hopper is empty, switches 65 and 67 will be closed and the switch 66 will be open. On the other hand, if the hopper is filled or partially filled with sandwiches, switches 65 and 67 will be open and switch 66 will be closed, as weight will be applied to the yieldable switch arms when the hopper is partially or fully loaded. The closing of the switch 66 when the hopper is partially or fully loaded is important because the closing of a circuit through the switch 66 will at the same time close a circuit through a solenoid magnet indicated at 68 and will cause this magnet through link 69 to exert a downward pull on a lever 70. This lever in turn will swing a deflector plate 71 into the vertical dotted line position shown in Fig. 6 and thereby permit a coin, when inserted, to drop straight down through the coin chute 28 to a point where it will actuate the arm 29 and close the switch or contacts 30. On the other hand, if the hopper is empty, switch 66 will be open, the circuit through the solenoid or magnet 68 will then be broken, and the deflector will assume the full line position shown in Fig. 6. Hence, if a coin is inserted when the hopper is empty, it will be deflected into a side chute 72 and will be returned. The switches 65 and 67 are provided for other purposes which will hereinafter be described.

In connection with the switch 66, another switch 66a is employed. This switch is actuated by one of the pins 59 and 60 mounted on the end of the drum. This switch cooperates with the switch 66 to maintain the circuit through the solenoid or magnet 68 when the coin is inserted, but the moment the drum starts to rotate, pin 59 or 60 will move away from the switch 66a and it will then open, thereby breaking the circuit through the solenoid 68 and permitting the deflector 71 to assume the full line or deflecting position shown in Fig. 6. This is important, as an individual unfamiliar with the machine might, after insertion of the first coin, expect that a sandwich should be almost immediately delivered and, when it is not, that individual might lose patience and insert a second coin. If this is done, the coin will be deflected to the chute 72 and returned, as the deflector assumes deflecting position a moment after the drum starts rotation due to the breaking of the circuit by means of the switch 66a. This circuit can be traced as follows: The current is supplied by the secondary side 74 of a transformer, the primary side 75 of which is always supplied with current from the main line circuit through wires 33 and 34. Commencing with one side of the secondary 74 of the transformer, the current follows through wire 76 to one terminal of the switch 66a. If the contacts are closed, it will pass through the other terminal, then through a signal lamp 77, then through wire 78 to the switch 66. If this switch is closed, it will pass through wire 79, through the coil of the solenoid 68, and then back through wire 80 which connects with the other side of the secondary of the transformer. Switch 66 is, as previously stated, closed if there are any sandwiches left in the hopper. Switch 66a will also be closed when the drum is at rest, as one of the pins 59 or 60 will engage and maintain it closed. Hence, when a coin is inserted, it will drop straight down through the chute 28 and will close the switch 30. This, as previously stated, closes the circuit through the holding coil 41 and this attracts the switch bar 45 and thereby closes the motor circuit 20 and, when this is closed, the drum starts rotating and the finger 59 or 60 will move out of engagement with the switch 66a and this will open and break the circuit through the solenoid 68, thereby placing the deflector 71 in a position to deflect any and all coins inserted when the machine is in operation. Also, the circuit through the solenoid 68 will be broken the moment the hopper is empty, as the switch 66 will then open and, if the coin is inserted, the deflector will again assume deflecting position and a coin if inserted will be returned.

In actual operation, let it be assumed that a sandwich has been inserted in the pocket 5 as shown in Fig. 1, and that other sandwiches are present in the hopper as shown by circular dotted lines in the same figure. With the machine in this condition it is only necessary to insert a coin. Insertion of a coin as previously stated will first close the switch 30. This temporarily forms a circuit through the holding coil 41, which circuit is permanently closed when the switch bar 45 is attracted to close the several contacts indicated at 46, 47, 48, and 49. When these contacts are closed, the circuit through the motor will be closed through the contacts 49. This contact will also close a circuit through the electrodes. The contacts 49, in addition to closing a circuit through the motor 20 and the electrodes will also close a circuit through the primary side 81 of a third transformer, the function of which will hereinafter be described. The circuit through the electrodes can be traced as follows: By referring to Figs. 3 and 6, it will be noted that wire 53 is extended to connect with a brush 82 which engages a commutator ring secured on the drum shaft. Current passes from this ring through a wire 83 to the electrode 15a. A sandwich has been previously introduced to the pocket 5 and as the electrodes assume their innermost position, it will be obvious that they will perforate the wrapper and enter the sausage contained within the sandwich. Hence when the current reaches the electrode 15a, it will pass through the sausage, then out through the electrode 18, then through wire 84 which is connected with a commutator ring 85. A brush 86 engages the ring and the current passes through the brush and wire 87 which completes the circuit, as wire 87 is connected with the wires 35 and 34.

In view of the foregoing, it will be seen that the insertion of the coin first momentarily closed the contacts of the switch 30 and thereby momentarily energized the holding coil 41. This in turn attracted the switch bar 45 and thereby closed the several circuits through the contacts 46, 47, 48, and 49. The contacts 49 closed three circuits: the motor circuit, the transformer circuit 81, and the electrode circuit. With the closing of the motor circuit the drum started revolving and it will continue to revolve until pocket 5 assumes the position assumed by pocket 6 in Fig. 1. At that point a pin 88 mounted on the drum engages the arm of switch 51 and closes a circuit therethrough. This switch, as previously stated, completes the circuit through the solenoid magnets 12 and 11a, and when they are energized, the electrodes 15a and 18 are retracted and the opposite electrodes 16a and 17 are introduced. That is, each time the drum makes a half revolution, the electrodes will be withdrawn from the sandwich which has been heated and the opposite set of electrodes will perforate the wrapper and enter the sandwich last introduced from the hopper compartment 2. The electrodes are always withdrawn from the heated sandwich when the pockets assume the position shown at 6, and, when the electrodes are withdrawn, the sandwich is released and it falls by gravity into an inclined chute 90, down which the sandwich rolls and reaches the position indicated by dotted lines at 91, where it is removed by the purchaser.

While the sandwich in the pocket is being heated during the half rotation of the drum, the empty pocket 6 will be moving upwardly into alignment with the lower end of the hopper and, as it passes by the lower end thereof, a fresh sandwich will fall by gravity from the lower end of the chute into the pocket. Thus, each time a pocket passes the lower end of the hopper, a fresh sandwich will be introduced and a heated sandwich will be discharged from the lower side of the drum. At the same time it will be noted that the drum functions as a closure or shutter for the lower end of the central compartment as sandwiches can not be removed except when a pocket comes in register therewith. There is only one pin 88 on the end of the drum adjacent the switches 50 and 51. When this pin engages and closes the contacts of the switch 51, it closes a circuit through the solenoid magnets 12 and 11a, and when it engages the contacts of the switch 50, it closes a circuit through the solenoids 11 and 12a. Thus these magnets will be automatically energized and the last sandwich introduced will always be perforated by the electrodes while the heated sandwich will be released and discharged.

After the drum has made a half revolution, it is essential to break the motor circuit 20 and, in fact, all of the circuits except the circuit through the magnet 68. This was broken, as previously explained, the moment the drum started rotating, but the circuit is re-established when the drum comes to rest after a hot sandwich has been discharged, as one of the pins 59 or 60 will re-engage the switch 66a and close the circuit, thereby energizing the magnet 68 and swinging the deflector 71 into position where the next coin introduced will drop straight down through the chute 28 to again actuate the machine.

Breaking of the motor circuit and all other circuits is accomplished as follows: The pins 59 and 60 previously referred to have been described as means for actuating the switch 66a. They also serve another function and that is to momentarily engage the lever 58 so as to close the contacts of the switch 57. When these contacts are closed, the secondary side 31 of the first named transformer is shorted. The current supply to the holding coil 41 is thus broken and the switch 45 will immediately open, thereby breaking the circuits through the several contacts 46, 47, 48, and 49. The contacts 49, as previously stated, controls not only the motor circuit but also the electrode circuit and a circuit through the primary 81 of the third named transformer. When these circuits are broken, the motor stops and the machine comes to rest. Current through the primary 81 of the third mentioned transformer is broken and so is the circuit through the electrodes. Breaking of the contacts 47 and 48 permanently breaks the circuits through the several solenoid magnets 11 and 12, 11a and 12a, and breaking of the contacts 46 permanently breaks the circuit through the holding coil 41. All circuits except that through the magnet 68 are thus broken and the machine will remain at rest until another coin is inserted, when the same cycle of operations will be repeated.

The lamp or light shown at 92 in Fig. 6 is connected with one side of the motor 20 and through wire 93 with the other side 34 of the main supply circuit. This light is employed for the purpose of indicating that the machine is in operation, as it only burns or lights when the motor is operating. It has previously been stated that the hopper C is divided into three compartments, to-wit, the central compartment 2 and the two side compartments indicated at 3 and 4. The sandwiches are first discharged from the central compartment 2 and, when this is completely empty, the contacts of switch 67 will close, as the spring actuated arm of said switch will be relieved of weight. When this switch closes, a circuit is formed through the coil of a magnet indicated at 94, and when this magnet is energized, it imparts rocking movement to a pivotally supported latch indicated at 95. This latch normally secures a hinged door 96 at the lower end of the compartment 4 in closed position, but when the latch 95 releases the same, it will swing open as indicated by dotted lines in Fig. 1 and the sandwiches contained in the compartment 4 will fall by gravity from the compartment 4 into the lower end of the central compartment 2 from where they will be removed one by one in the usual manner. When the last sandwich passes out of the compartment 4, the spring arm of the switch 65 will be relieved of weight and the circuit will be closed through the contacts of the switch 65. This prepares a circuit for a second magnet indicated at 97. This magnet controls a pivotally mounted latch 98, which in turn releases a door similar to that shown at 96. But the circuit through the magnet 97 is not completed until the last sandwich discharges from the lower end of the compartment 2. When this is done, the spring arm of the switch 67 is relieved of weight and when the contacts of the switch 67 are closed, the circuit through the magnet 97 will be completed. The weight of the sandwiches in the compartment 3, exerting pressure against the door, will cause it to swing to assume the opposite position, and the sandwiches in the compartment 3 will thus enter the lower portion of the central compartment and will be discharged therefrom one by one each time the drum makes a half revolution. Finally, when the last sandwich is discharged, switch 67 will close and switch 66 will open and, as this switch, together with the switch 66a, controls the circuit through the magnet 68, the circuit therethrough will remain open until the hopper is again refilled. Hence if anyone inserts a coin after the hopper has been completely emptied, that coin will be returned, as it will be deflected into the coin chute 72.

Having thus described my invention, what I claim and desire to secure by Letters Patent is—

1. In a food vending machine a drum having a pocket formed therein for successive reception of food articles, a pair of shiftable pointed electrodes carried by the drum, one at each end of the pocket and in register therewith, means for imparting rotational movement to the drum, cam controlled means operable upon rotation of the drum to impart shifting movement to the electrodes to cause the pointed ends to enter and penetrate a food article placed in the pocket, means for closing an electric circuit through the electrodes and a penetrated food article in the pocket to heat the food article, and means actuated by rotation of the drum for withdrawing the electrodes after the article has been heated by flow of the current and to permit removal of the article from the pocket.

2. In a food vending machine a drum having a pocket formed therein for successive reception of food articles, a pair of shiftable pointed electrodes mounted on the drum one at each end of the pocket and in register therewith, a plurality of electromagnets carried by the drum and operatively associated with the electrodes for imparting shifting movement to the electrodes to cause the same to enter and penetrate a food article placed in the pocket or to cause the same to be withdrawn therefrom, means for imparting rotational movement to the drum, a plurality of contacts actuated by rotation of the drum for energizing and de-energizing said electromagnets, and means for closing an electric circuit through the electrodes and a penetrated food article in said pocket.

3. In a food vending machine, a drum having a pocket formed therein for reception of a food article, a shiftable pointed electrode at each end of the pocket movable into the pocket to penetrate a food article placed therein and out of the pocket to release the penetrated article, electromagnets controlling the shifting movement of each electrode, means for imparting rotational movement to the drum, means for closing an electric circuit through the electrodes and a penetrated food article in the pocket, and a plurality of switches engageable by the drum in succession upon rotation of the latter, said switches being operable upon engagement with the drum to energize certain of the electromagnets and cause release of the penetrated article by the electrodes and to open the circuit through the electrodes.

4. In a food vending machine, a drum having a pocket formed therein for reception of a food article, an electric motor for rotating the drum, means for closing an electric circuit through the motor to rotate the drum, a shiftable pointed electrode at each end of the pocket movable into the pocket to penetrate a food article placed therein and out of the pocket to release the penetrated article, electromagnets controlling the shifting movement of each electrode, means for closing an electric circuit through the electrodes and a penetrated food article in the pocket, and a plurality of switches engageable by the drum in succession upon rotation of the latter, said switches being operable in succession to energize certain of the electromagnets and cause release of a penetrated article by the electrodes, and to open the circuits through the electrodes and the motor.

5. In a food vending machine, a drum having a pair of pockets formed therein for successive and alternate reception of food articles to be heated and dispensed, an electric motor for rotating the drum, means for closing an electric circuit through the motor, a shiftable pointed electrode at each end of each pocket movable into and out of the pocket to penetrate and release an article contained therein, electromagnets controlling the movements of said electrodes, means for closing an electric circuit through the electrodes and an article penetrated thereby, and a plurality of switches engageable by the drum in succession upon rotation of the latter, said switches being operable in succession to actuate certain of the electromagnets and cause release of a penetrated article by the electrodes, to open the circuits through the electrodes, to actuate other of the electromagnets and cause penetration of a food article by the electrodes, and to open the circuits through the electrodes and motor.

6. In a food vending machine, a drum having a pair of pockets formed therein for successive and alternate reception of food articles to be heated and dispensed, an electric motor for rotating the drum, article-penetrating electrodes at each end of each pocket movable into and out of the pocket for penetration and release of an article respectively, electromagnets for controlling the movements of said electrodes, means for simultaneously closing an electric circuit through the motor and for closing an electric circuit through the electrodes and an article penetrated thereby, and means operable upon rotation of the drum for actuating the electromagnets to effect release of an article in one pocket and to effect penetration of an article in the other pocket.

7. In a food vending machine, a drum having a pair of pockets formed therein for successive and alternate reception of food articles to be heated and dispensed, a pair of laterally shiftable electrode-carrying elements including a pair of pointed electrodes, one electrode of each element being opposed to an electrode of the other element and the two electrodes being in register with the ends of a pocket, means for rotating the drum, cam means engageable with the drum for effecting alternate shifting of the electrode-carrying elements in opposite directions to effect successive penetration and release of food articles placed within said pockets, and means for closing an electric circuit through the opposed electrodes and a food article penetrated thereby.

8. In a food vending machine, a drum having a pair of pockets formed therein for successive and alternate reception of food articles to be heated and dispensed, a pair of laterally shiftable electrode-carrying elements including a pair of pointed electrodes, one electrode of each element being opposed to an electrode of the other element and the two electrodes being in register with the ends of a pocket, a core carried by each element, a pair of solenoid windings for each core operable upon energization thereof to shift the same in opposite directions to effect successive penetration and release of food articles placed within said pockets, means for rotating the drum, cam controlled means engageable with the drum for energizing said solenoid windings, and means for closing an electric circuit through the opposed electrodes and a food article penetrated thereby.

EVERETT P. FORD.